Figure 1:
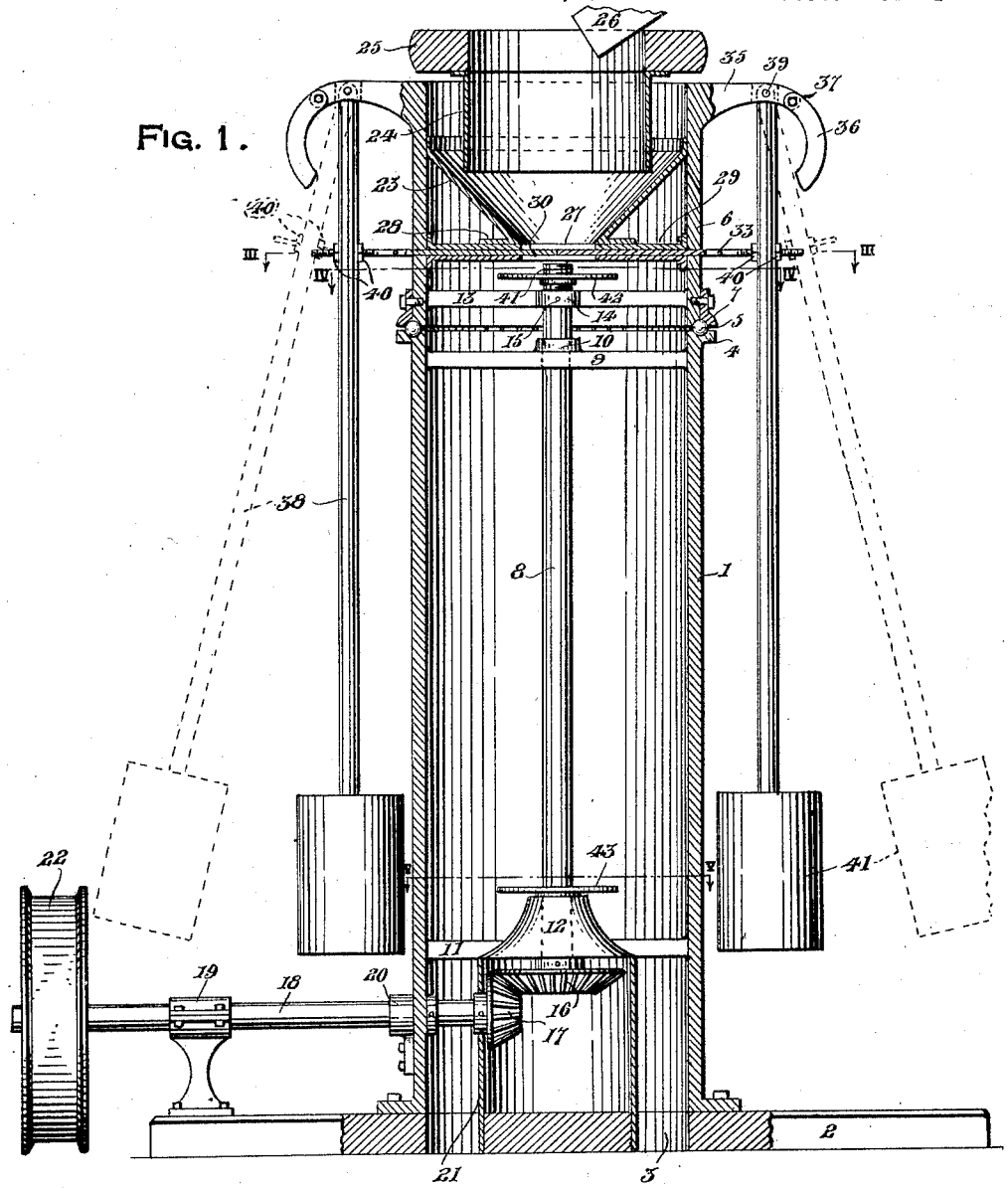

Aug. 18, 1925.  1,550,567
C. E. OLIVER
FEED GOVERNOR
Filed Nov. 13, 1924   2 Sheets-Sheet 1

Inventor
C. E. Oliver

By F. T. Bryant
Attorney.

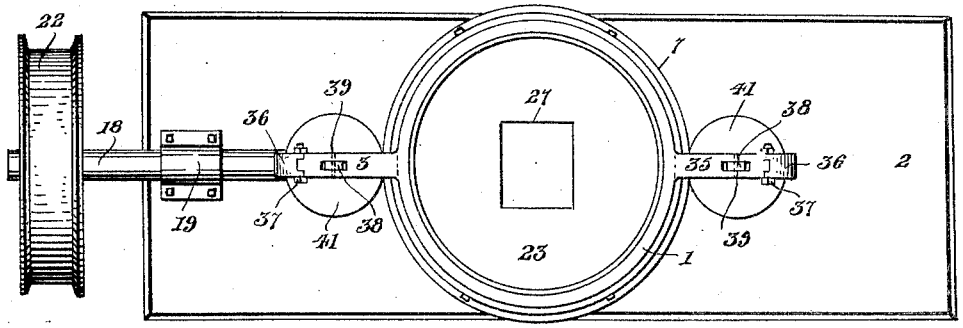
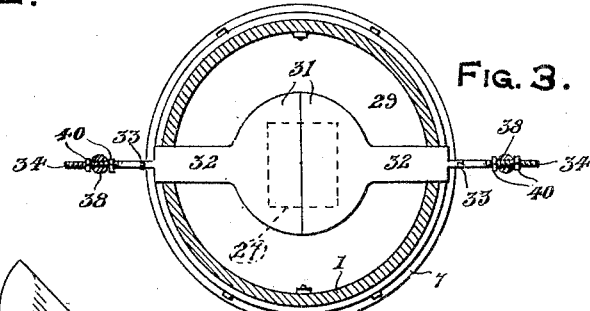
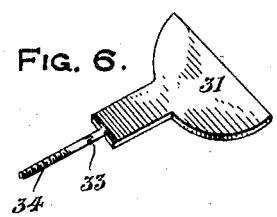
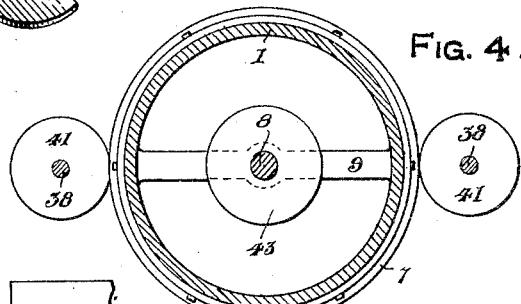
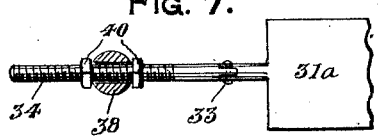
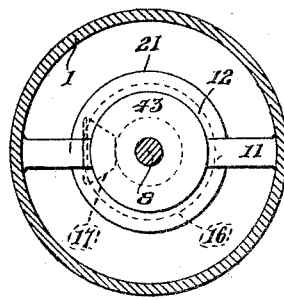

Patented Aug. 18, 1925.

1,550,567

UNITED STATES PATENT OFFICE.

CHARLES EDWIN OLIVER, OF WARSAW, INDIANA.

FEED GOVERNOR.

Application filed November 13, 1924. Serial No. 749,704.

*To all whom it may concern:*

Be it known that I, CHARLES EDWIN OLIVER, a subject of the King of Great Britain, residing at Warsaw, in the county of Kosciusko and State of Indiana, have invented certain new and useful Improvements in Feed Governors, of which the following is a specification.

This invention relates to certain new and useful improvements in feed governors of the type designed for regulating the flow of fluent material such as grain, feed, sand, or any granular or like material and is entirely automatic in its operation by being connected with a machine to which the material is to be fed, the passage of material thru the governor being stopped when the associated machine comes to rest.

A further object of the invention is to provide a feed governor especially designed for association with a mill and having the feed regulating means adjustable and controlled in their operation in a manner to prevent an excess passage of feed therethrough irrespective of the speed of operation of the mill.

With the above general objects in view and others that will become apparent as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a vertical longitudinal sectional view of a speed brake feed governor constructed in accordance with the present invention, the pendulous arm of the governor to which the sliding gate valves are attached being illustrated by dotted lines in extended position, Figure 2 is a top plan view of the governor, Figure 3 is a horizontal sectional view taken on line III—III of Fig. 1 showing the gate valves in their closed positions, Figure 4 is a horizontal sectional view taken on line IV—IV of Fig. 1 showing the disk plate disposed directly beneath the valve controlled hopper outlet to accomplish the choking of the hopper outlet should the gate valves fail to close, Figure 5 is a horizontal sectional view taken on line V—V of Fig. 1 showing the disk plate disposed adjacent the lower end of the vertical rotatable shaft to discharge the fluent material laterally of the lower bearing end of the shaft, Figure 6 is a perspective view of one of the sliding gate valves, and Figure 7 is a detail view, partly in section showing a modified configuration of the sliding gate valve and the connection between the gate valve and one of the pendulous arms.

Referring more in detail to the accompanying drawing, there is illustrated a feed governor designed for controlling the passage of such fluent material as grain, feed, coal, gravel or material of a similar nature to a machine that is associated with the governor, and for purposes of illustration and description, the governor disclosed herein will be described in connection with a mill. The governor embodies a cylindrical housing 1 that is anchored at its lower end upon a floor or other supporting frame 2, the housing 1 being open at its lower end and communicating with passages 3 that lead to a mill. The upper end of the housing 1 is provided with an outwardly directed annular flange 4 that is provided with a groove in the upper face thereof to receive bearing balls 5 that support the lower end of a rotatable cylinder 6, the ring 7 carried by the lower end of said cylinder being fashioned to contact the outer sides of the bearing balls 5 and for retaining the cylinder properly positioned upon the upper end of the stationary housing 1.

The rotating means for the cylinder 6 includes a vertical shaft 8 positioned axially of the housing 1 with the upper end thereof extending into the cylinder, the upper end of the housing carrying a spider frame 9 having a bearing shaft arranged at the center thereof for the shaft 8 while the housing 1, slightly spaced upwardly of the lower end thereof is provided with a second spider frame 11 having a relatively wide substantially frusto-conical bearing 12 arranged centrally thereof for the lower end of said shaft. The lower end of the rotating cylinder 6 carries a spider frame 13 having a bearing 14 arranged centrally thereof that is locked to the shaft 8 as at 15. The lower end of the shaft 8 below the spider frame 11 has a bevel gear 16 fixed thereto that meshes with a bevel pinion 17 fixed to the inner end of a horizontal shaft 18 mounted in a bearing 19 upon the base support 2 and in another bearing 20 carried by the side wall of the housing 1. A tubular member 21 encloses the gear and pinion 16 and 17 respectively and extends between the lower bearing 12 to the shaft 8 and the support 2. A pulley wheel 22 is fixed to the outer end of the shaft 18 and is connected with a movable part of the mill. It will therefore be seen that when the mill is in operation, motion thereof is communicated to the shaft 18, and by the meshing pinion and gear 17 and 16 respectively, the shaft 8 and cylinder 6 fixed to the upper end of said shaft are rotated.

An inverted frusto-conical hopper 23 is secured at its upper annular edge within the cylinder 6 and a feed spout 24 carried by the block 25 has its lower end extending into said hopper thru the open upper end of the cylinder, while a feed hopper 26 discharges the material thru said block and spout to said hopper 23. The lower open end 27 of the hopper 23 carries an outwardly directed horizontal flange 28 that is supported upon the guide plates 29 that are spaced from each other as illustrated in Fig. 1, the central portions of the guide plates 29 having openings 30 therein of any desired configuration that register with the lower open end 27 of the hopper 23. A pair of sliding gate valves 31 move between the guide plates 29, the gate valves 31 being preferably of semi-cylindrical formation as illustrated in Fig. 3 and meeting at their closing edges centrally of the openings 27 and 30, each gate valve 31 carrying an outwardly directed arm 32 extending thru an opening in the cylinder 6 and having a hinge connection 33 with a threaded rod 34.

The operating means for the gate valves 31 includes pendulous rods suspended from outwardly directed bracket arms 35 carried by the upper end of the cylinder 6 while adjustable stops 36 are pivotally connected as at 37 to the outer ends of the bracket arms 35 as clearly shown in Figs. 1 and 2. A rod 38 is pivotally suspended as at 39 from each bracket arm 35 and has the threaded rod 34 freely extending thru an opening therein with set nuts 40 threaded on the rod 34 engaging opposite sides of the pendulous rods 38 for adjusting the pendulous rods relatively to the gate valves 31. Weights 41 are carried by the lower ends of the pendulous rods and normally hold the meeting edges of the gate valves 31 in engagement with the lower end of the hopper 23 closed. When the cylinder 6 is rotated by the shaft 8, the opening movement of the gate valves 31 under centrifugal force of the pendulous rods 38 is regulated by the adjustable stops 36 that may be set to the desired position to regulate the flow of material from the hopper 23.

To prevent the leakage of material thru the hopper opening 27, should the gate valves 31 fail to be closed completely by the interposition of material passing therebetween, the upper end of the rod 8 is threaded as at 41 to receive an adjustable disk 42 that may have its positions varied with respect to the opening 27 for the collection of material thereon which will constitute an abutment to prevent the escape of material from the hopper 23 and a consequent feeding thereof thru the housing 1 to the outlet 3. The disk 42 also directs the material laterally of the upper bearings for the shaft 8 while the disk 43 carried by the lower end of the shaft 8 above the bearing 12 directs the material passing thru the housing outwardly of said bearing 12. The openings in the lower end of the hopper 23 and the guide plates 29 may be of any configuration desired, and the gate valves 31 may also be of any desired form, the gate valve 31ª shown in Fig. 7 being rectangular in plan view.

From the above detail description of the device, it is believed that the construction and operation thereof will at once be apparent, it being noted that the feeding of material to the mill is properly regulated by the setting of the pendulous arms 38 in connection with the adjustable stops 36 so that regardless of the speed of operation of the mill, i. e., the excessive speed thereof, the pendulous arms 38 will swing out only a predetermined distance to open the gate valves 31 for permitting a predetermined flow of material thru the governor. The disk 42 at the upper end of the shaft 8 provides an effective seal, should the gate valves 31 become jammed during their closing operation, while the lower disk 43 throws the material outwardly of the lower bearing 12 to protect the same from the material. The hinge connection 33 between the arm 32 of the gate valve and the threaded rod 34 accommodates a free pivotal movement of the pendulous rod 38 upon its mounting 39 to insure an easy sliding movement of the gate valves 31.

While there are herein shown and described the preferred embodiments of the present invention, it is nevertheless to be understood that minor changes may be made therein without departing from the spirit and scope of the invention as claimed.

What is claimed is:—

1. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper and pendulous arms suspended from the cylinder and connected with the gate valves.

2. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, and means carried by the cylinder cooperating with the pendulous arms to limit the outward swinging movement thereof.

3. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, and adjustable stops carried by the cylinder for limiting the outward swinging movements of the pendulous arms.

4. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, and means carried by the upper end of the shaft adjacent the outlet of the hopper to prevent the flow of material should the gate valves fail to close completely.

5. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, and an adjustable disk mounted on the upper end of the shaft adjacent the outlet of the hopper to choke the flow of material should the gate valves fail to close completely.

6. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, bearings for the upper and lower ends of the shafts, and disk plates carried by the shaft directly above each bearing to spread the material outwardly away from the bearings.

7. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, means carried by the cylinder cooperating with the pendulous arms to limit the outward swinging movement thereof, bearings for the upper and lower ends of the shafts, and disk plates carried by the shaft directly above each bearing to spread the material outwardly away from the bearings.

8. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gage valves associated with the feed hopper, pendulous arms suspended from the cylinder and connected with the gate valves, adjustable stops carried by the cylinder for limiting the outward swinging movements of the pendulous arms, bearings for the upper and lower ends of the shafts, and disk plates carried by the shaft directly above each bearing to spread the material outwardly away from the bearings.

9. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, a pair of spaced horizontal guide plates with the upper plate engaged by the lower end of the hopper, there being central openings in the guide plates registering with the opening in the lower end of the hopper, and the gate valves being slidable between the guide plates.

10. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, means carried by the cylinder cooperating with the pendulous arms to limit the outward swinging movement thereof, a pair of spaced horizontal guide plates with the upper plate engaged by the lower end of the hopper, there being central openings in the guide plates registering with the opening in the lower end of the hopper, and the gate valves being slidable between the guide plates.

11. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, adjustable stops carried by the cylinder for limiting the outward swinging movements of the pendulous arms, a pair of spaced horizontal guide plates with the upper plate engaged by the lower end of the hopper, there being central openings in the guide plates registering with the opening in the lower end of the hopper, and the gate valves being slidable between the guide plates.

12. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, a pair of spaced horizontal guide plates with the upper plate engaged by the lower end of the hopper, there being central openings in the guide plates registering with the opening in the lower end of the hopper, the gate valves being slidable between the guide plates, and the connection between the gate valves and pendulous arms including threaded rods pivoted to the outer ends of the valves with the outer ends of the rods freely extending through openings provided therefor in the pendulous arms, and nuts threaded on the rod at opposite sides of the arm for varying the initial positions of the arms relative to the valves.

13. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, means carried by the cylinder cooperating with the pendulous arms to limit the outward swinging movement thereof, a pair of spaced horizontal guide plates with the upper plate engaged by the lower end of the hopper, there being central openings in the guide plates registering with the opening in the lower end of the hopper, the gate valves being slidable between the guide plates, and the connection between the gate valves and pendulous ends of the valves with the outer ends of the rods freely extending through openings provided therefor in the pendulous arms and nuts threaded on the rod at opposite sides of the arm for varying the initial positions of the arms relative to the valves.

14. In a regulator for fluent material, a stationary housing, a cylinder rotatable on the upper end of the housing, a shaft journaled in the housing and secured at its upper end to the cylinder, means for rotating the shaft, a feed hopper carried by the cylinder, gate valves associated with the feed hopper, pendulous arms suspended from the cylinder and connected with the gate valves, adjustable stops carried by the cylinder for limiting the outward swinging movements of the pendulous arms, a pair of spaced horizontal guide plates with the upper plate engaged by the lower end of the hopper, there being central openings in the guide plates registering with the opening in the lower end of the hopper, and the gate valves being slidable between the guide plates, and the connection between the gate valve and pendulous arms including threaded rods pivoted to the outer ends of the valves with the outer ends of the rods freely extending through openings provided therefor in the pendulous arms and nuts threaded on the rod at opposite sides of the arm for varying the initial positions of the arms relative to the valves.

In testimony whereof I affix my signature.

CHARLES EDWIN OLIVER.